US008868831B2

(12) United States Patent
Goyal et al.

(10) Patent No.: US 8,868,831 B2
(45) Date of Patent: Oct. 21, 2014

(54) CACHING DATA BETWEEN A DATABASE SERVER AND A STORAGE SYSTEM

(75) Inventors: Kiran Badrinarain Goyal, Foster City, CA (US); Neil J. S. Macnaughton, Los Gatos, CA (US); Eugene Ho, Fremont, CA (US); Adam Y. Lee, San Jose, CA (US); Vipin Gokhale, San Ramon, CA (US); Wei-Ming Hu, Palo Alto, CA (US); Juan R. Loaiza, Woodside, CA (US); Kothanda Umamageswaran, Sunnyvale, CA (US); Bharat C. V. Baddepudi, San Jose, CA (US); Boris Erlikhman, Mountain View, CA (US); Alexander Tsukerman, Foster City, CA (US); Selcuk Aya, Redwood City, CA (US); Roger Hansen, San Francisco, CA (US); Adrian Ng, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1136 days.

(21) Appl. No.: 12/631,985

(22) Filed: Dec. 7, 2009

(65) Prior Publication Data

US 2011/0066791 A1 Mar. 17, 2011

Related U.S. Application Data

(60) Provisional application No. 61/242,316, filed on Sep. 14, 2009.

(51) Int. Cl.
*G06F 12/08* (2006.01)
*G06F 17/30* (2006.01)

(52) U.S. Cl.
CPC ...... *G06F 12/0888* (2013.01); *G06F 2212/312* (2013.01); *G06F 2212/465* (2013.01); *G06F 12/0866* (2013.01); *G06F 2212/311* (2013.01); *G06F 12/0897* (2013.01); *G06F 17/3048* (2013.01)
USPC ...................... 711/118; 707/E17.12; 711/122

(58) Field of Classification Search
CPC .......... G06F 12/0866; G06F 17/30321; G06F 17/30902; G06F 2212/465; G06F 12/0888; G06F 17/3048; G06F 12/0246; G06F 12/0811; G06F 12/0897; G06F 17/3056; G06F 2201/80; G06F 2201/885; G06F 2212/202; G06F 2212/311; G06F 2212/312
USPC ............................. 711/118, 122; 707/E17.12
See application file for complete search history.

(56) References Cited

U.S. PATENT DOCUMENTS

| 4,425,615 A | 1/1984 | Swenson et al. |
| 5,717,893 A | 2/1998 | Mattson |

(Continued)

FOREIGN PATENT DOCUMENTS

| CN | 101150483 A | 3/2008 |
| GB | 2409 301 A | 6/2005 |

(Continued)

OTHER PUBLICATIONS

PCT/US2009/057526 International Search Report and Written Opinion Mailed Sep. 18, 2009, 17 pages.

(Continued)

*Primary Examiner* — Hashem Farrokh
(74) *Attorney, Agent, or Firm* — Hickman Palermo Truong Becker Bingham Wong LLP (57) ABSTRACT

Techniques are provided for using an intermediate cache between the shared cache of a database server and the non-volatile storage of a storage system. The intermediate cache may be local to the machine upon which the database server is executing, or may be implemented within the storage system. In one embodiment, the database system includes both a DB server-side intermediate cache, and a storage-side intermediate cache. The caching policies used to populate the intermediate cache are intelligent, taking into account factors that may include which database object an item belongs to, the item type of the item, a characteristic of the item; or the database operation in which the item is involved.

50 Claims, 6 Drawing Sheets

(56) References Cited

U.S. PATENT DOCUMENTS

| | | | |
|---|---|---|---|
| 6,044,367 A | 3/2000 | Wolff | |
| 6,728,823 B1* | 4/2004 | Walker et al. | 710/315 |
| 6,886,084 B2 | 4/2005 | Kawashima et al. | |
| 6,922,754 B2 | 7/2005 | Liu et al. | |
| 6,928,451 B2 | 8/2005 | Mogi et al. | |
| 7,069,324 B1 | 6/2006 | Tiwana et al. | |
| 7,159,076 B2 | 1/2007 | Madter | |
| 7,165,144 B2 | 1/2007 | Choubal et al. | |
| 7,228,354 B2 | 6/2007 | Chambliss et al. | |
| 7,237,027 B1 | 6/2007 | Raccah et al. | |
| 7,290,090 B2 | 10/2007 | Madter | |
| 7,461,147 B1 | 12/2008 | Mowat et al. | |
| 7,506,103 B2 | 3/2009 | Madter | |
| 7,636,814 B1 | 12/2009 | Karr et al. | |
| 7,836,262 B2 | 11/2010 | Gunna et al. | |
| 7,904,562 B2 | 3/2011 | Takase et al. | |
| 8,244,984 B1* | 8/2012 | Glasco et al. | 711/133 |
| 8,370,452 B2* | 2/2013 | Harvell et al. | 709/217 |
| 2002/0143755 A1 | 10/2002 | Wynblatt et al. | |
| 2003/0115324 A1 | 6/2003 | Blumenau et al. | |
| 2004/0003087 A1 | 1/2004 | Chambliss et al. | |
| 2004/0062106 A1 | 4/2004 | Ramesh et al. | |
| 2004/0117441 A1 | 6/2004 | Liu et al. | |
| 2004/0148486 A1 | 7/2004 | Burton | |
| 2004/0225845 A1* | 11/2004 | Kruckemyer et al. | 711/146 |
| 2004/0254943 A1* | 12/2004 | Malcolm | 707/100 |
| 2005/0086520 A1 | 4/2005 | Dharmapurikar et al. | |
| 2005/0120025 A1 | 6/2005 | Rodriguez et al. | |
| 2005/0160224 A1* | 7/2005 | Cuomo et al. | 711/118 |
| 2005/0193160 A1 | 9/2005 | Bhatte et al. | |
| 2005/0210202 A1 | 9/2005 | Choubal et al. | |
| 2006/0106890 A1* | 5/2006 | Paul et al. | 707/203 |
| 2006/0224451 A1 | 10/2006 | Kerschbrock et al. | |
| 2006/0224551 A1 | 10/2006 | Lariba-Pey et al. | |
| 2007/0067575 A1 | 3/2007 | Morris et al. | |
| 2007/0124415 A1 | 5/2007 | Lev-Ran et al. | |
| 2007/0260819 A1 | 11/2007 | Gao et al. | |
| 2007/0271570 A1 | 11/2007 | Brown et al. | |
| 2008/0016283 A1 | 1/2008 | Madter | |
| 2008/0046736 A1 | 2/2008 | Arimilli et al. | |
| 2008/0104283 A1 | 5/2008 | Shin et al. | |
| 2008/0147599 A1 | 6/2008 | Young-Lai | |
| 2008/0155229 A1 | 6/2008 | Beyer et al. | |
| 2008/0177803 A1 | 7/2008 | Fineberg et al. | |
| 2008/0244184 A1 | 10/2008 | Lewis et al. | |
| 2008/0244209 A1 | 10/2008 | Seelam et al. | |
| 2009/0193189 A1 | 7/2009 | Carswell et al. | |
| 2009/0248871 A1 | 10/2009 | Takase et al. | |
| 2010/0017556 A1* | 1/2010 | Chin et al. | 711/103 |
| 2010/0077107 A1 | 3/2010 | Potapov et al. | |
| 2010/0082648 A1 | 4/2010 | Potapov et al. | |
| 2010/0122026 A1 | 5/2010 | Umamageswaran et al. | |
| 2011/0022801 A1 | 1/2011 | Flynn | |
| 2011/0047084 A1 | 2/2011 | Manzallini et al. | |
| 2011/0173325 A1 | 7/2011 | Cherian et al. | |
| 2012/0159480 A1 | 6/2012 | Matsuzawa | |
| 2013/0086330 A1 | 4/2013 | Baddepudi et al. | |
| 2013/0275402 A1 | 10/2013 | Zhou et al. | |
| 2013/0326152 A1 | 12/2013 | Loaiza et al. | |

FOREIGN PATENT DOCUMENTS

| | | |
|---|---|---|
| JP | 2002-278704 A | 9/2002 |
| JP | 2003-150419 A | 5/2003 |
| JP | 2004-038758 A | 2/2004 |
| WO | WO 93/18461 | 9/1993 |

OTHER PUBLICATIONS

PCT/US2009/057526 current claims, 10 pages.

O'Neil, P., et al., "Multi-table joins through bitmapped join indices", SIGMOD Record, ACM, New York, NY, US, vol. 24, No. 3, Sep. 1, 1995, pp. 8-11, ISSN: 0163-5808.

Mackert, F. Lothar et al., "R optimizer validation and performance evaluation for local queries" SIGMOD Record, ACM, New York, NY, US., vol. 15, No. 2, Jun. 1, 1986, pp. 84-95, ISSN: 0163-5808.

Zhe, Li, et al., "PERF join: an alternative to two-way semijoin and Bloomjoin" Proceedings of the 1995 ACM CIKM International Conference on Information and Knowledge Management ACM New York. NY, US., 1995, pp. 187-144, ISBN: 0-89791-812-6.

Loizos, M., et al., "Improving distributed join efficiency with extended bloom filter operations", Advanced Networking and Applications, 2007. AINA '07., 21st International Conference on IEEE, PI, May 1, 2007, pp. 187-194, ISBN: 978-0-7695-2846-5.

PCT/US2009/057590 International Search Report & Written Opinion Dated Feb. 11, 2010, 16 pages.

PCT/US2009/057590 Current Claims, 10 pages.

Graefe, G. "The Five-minute Rule" dated Jul./Aug. 2008 (13 pages).

Bonwick, J. et al., "ZFS The Last Word In File Systems" 2009 (44 pages).

IBM TDB, "A Scheduling Algorithm For Processing Mutually Exclusive Workloads in a multi-system Configuration", ip.com dated Aug. 19, 2002 (3 pages).

Loizos et al., "Improving Join Efficiency with Extended Bloom Filter Operations", AMC, 2007, 8 pages.

* cited by examiner

CACHING DATA BETWEEN A DATABASE SERVER AND A STORAGE SYSTEM

CROSS-REFERENCE TO RELATED APPLICATION; BENEFIT CLAIM

This application claims benefit of Provisional Application 61/242,316, filed Sep. 14, 2009, the entire contents of both of which are hereby incorporated by reference as if fully set forth herein, under 35 U.S.C. §119(e).

FIELD OF THE INVENTION

The present invention relates to caching and, more specifically, caching data that is transferred between a database server and a storage system.

BACKGROUND

Database servers manage data for database clients. In a typical database system, database clients issue database commands to the database servers to cause the database server to create logical storage structures, such as tables, and to insert, update, read and delete items within those logical storage structures. The items that are managed by the database servers, as well as the logical structures used to contain the items, are typically stored on non-volatile memory, such as magnetic disks, provided by a storage system.

Before a database server can read or update data, the database server must retrieve the data from the storage system into volatile memory that is local to the database server. To prevent the same item from having to be retrieved every time it is needed, the database server typically stores the retrieved items in a buffer cache within the volatile memory that is local to the database server. Typically, the volatile memory used by the buffer cache is significantly faster, more expensive, and smaller than the non-volatile memory used by the storage system to persistently store the items. Consequently, even when the buffer cache is completely full, the buffer cache still only holds a fraction of the total data managed by the database server.

Because the buffer cache holds only a fraction of the total data managed by a database server, there is frequently a need to replace items in the buffer cache with newly requested items. Typically, the database server selects which items to replace based on how recently the items have been used, where least recently used items are replaced before more recently used items.

Figure 1:
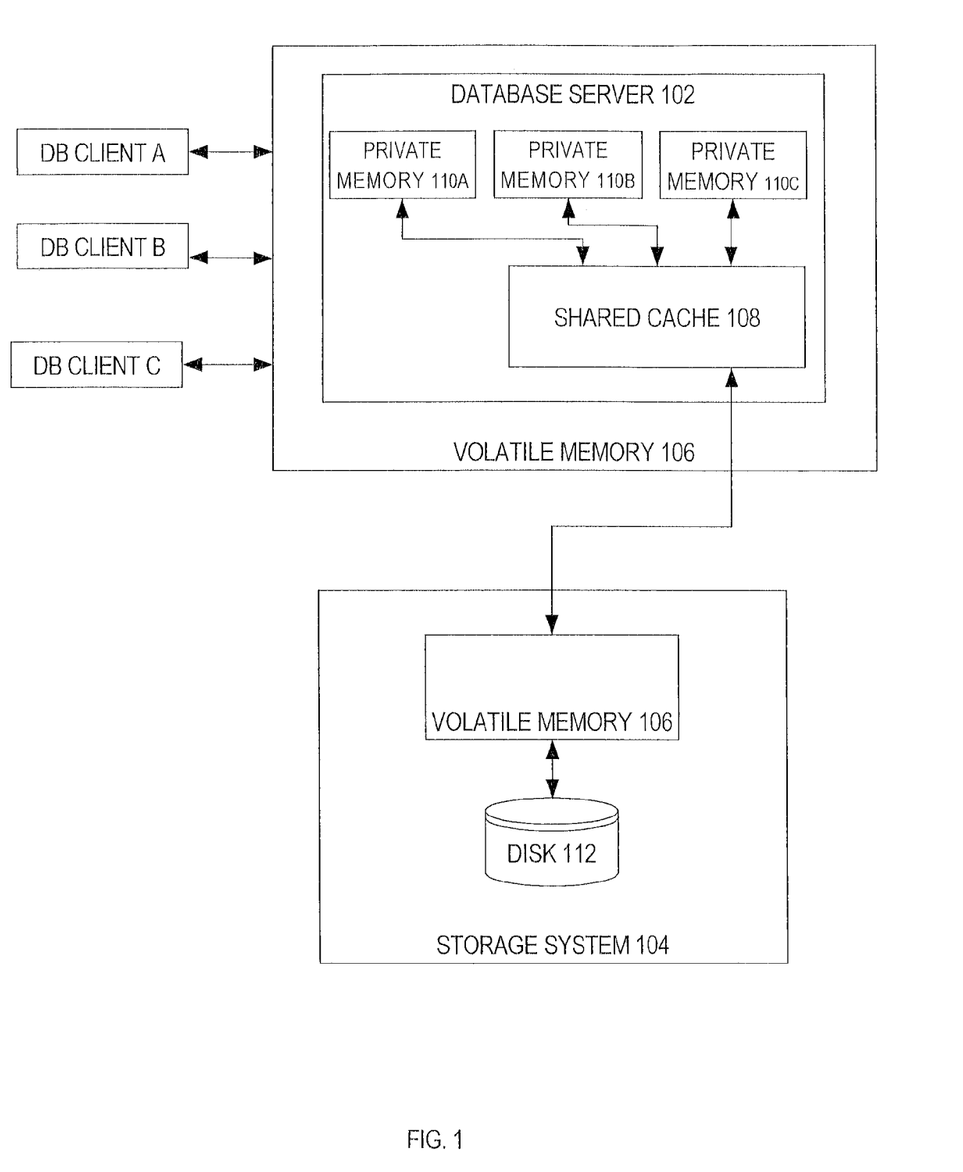
FIG. 1 is a block diagram of a typical database system.

FIG. 1 is a block diagram illustrating a typical database system in which multiple clients (DB client A, DB client B and DB client C) issue commands to a database server 102. Database server 102 resides in the volatile memory 106 of a computing device. That same volatile memory is typically used for both the buffer cache (shown as shared cache 108), and for private memory 110A-110C. Private memory 110A-110C differs from shared cache 108 in that all DB clients A-C are allowed read items that reside in shared cache 108, but only the DB client A-C that corresponds to a particular private memory 110A-C is allowed to see items that reside in that private memory 110A-C. In the illustrated example, private memory 110A is used for operations requested by DB client A, private memory 110B is used for operations requested by DB client B, and private memory 110C is used for operations requested by DB client C.

Typically, when a database client requests to read an item that does not currently reside in volatile memory 106, database server 102 sends a request for the item to the storage system 104. Storage system 104 responds to the request by reading the item from non-volatile memory (such as disk 112), and sending the item to the database server 102. As data is written to or retrieved from disk 112, the data is temporarily stored in volatile memory 106 within storage system 104.

When the database server 102 receives the item from storage system 104, database server 102 stores the item in shared cache 108. If shared cache 108 is currently full, the database server 102 first makes room for the new item Ay selecting an existing item for replacement. If the item that is selected for replacement is "dirty", then the item must be sent to the storage system 104 before replacing the item within the shared cache 108. A dirty item is an item that has been updated after its retrieval from the storage system 104, so that the version of the item that resides in volatile memory 106 differs from and is more recent than the version of the item that resides in the storage system 104.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described hereafter for using an intermediate cache between the shared cache of a database server and the non-volatile storage of a storage system. The intermediate cache may be local to the machine upon which the database server is executing, or may be implemented within the storage system. In one embodiment, the database system includes both a DB server-side intermediate cache, and a storage-side intermediate cache.

According to one aspect of the invention, the intermediate cache is larger, slower, and less expensive than the shared cache used by the database server, but smaller, faster, and more expensive than the non-volatile storage used by the storage system. For example, in one embodiment, the shared cache is stored within DRAM, the intermediate cache is stored within FLASH memory, and the storage system uses magnetic disks to persistently store the items managed by the database server. However, this is merely one example of the types of memory devices that may be used to implement a database system according to an embodiment of the invention. Thus, the system may alternatively use DRAM for the shared cache, a smaller higher-speed magnetic disk for the intermediate cache, and larger lower-speed magnetic disks to persistently store the data.

The Intermediate Cache

Figure 2:
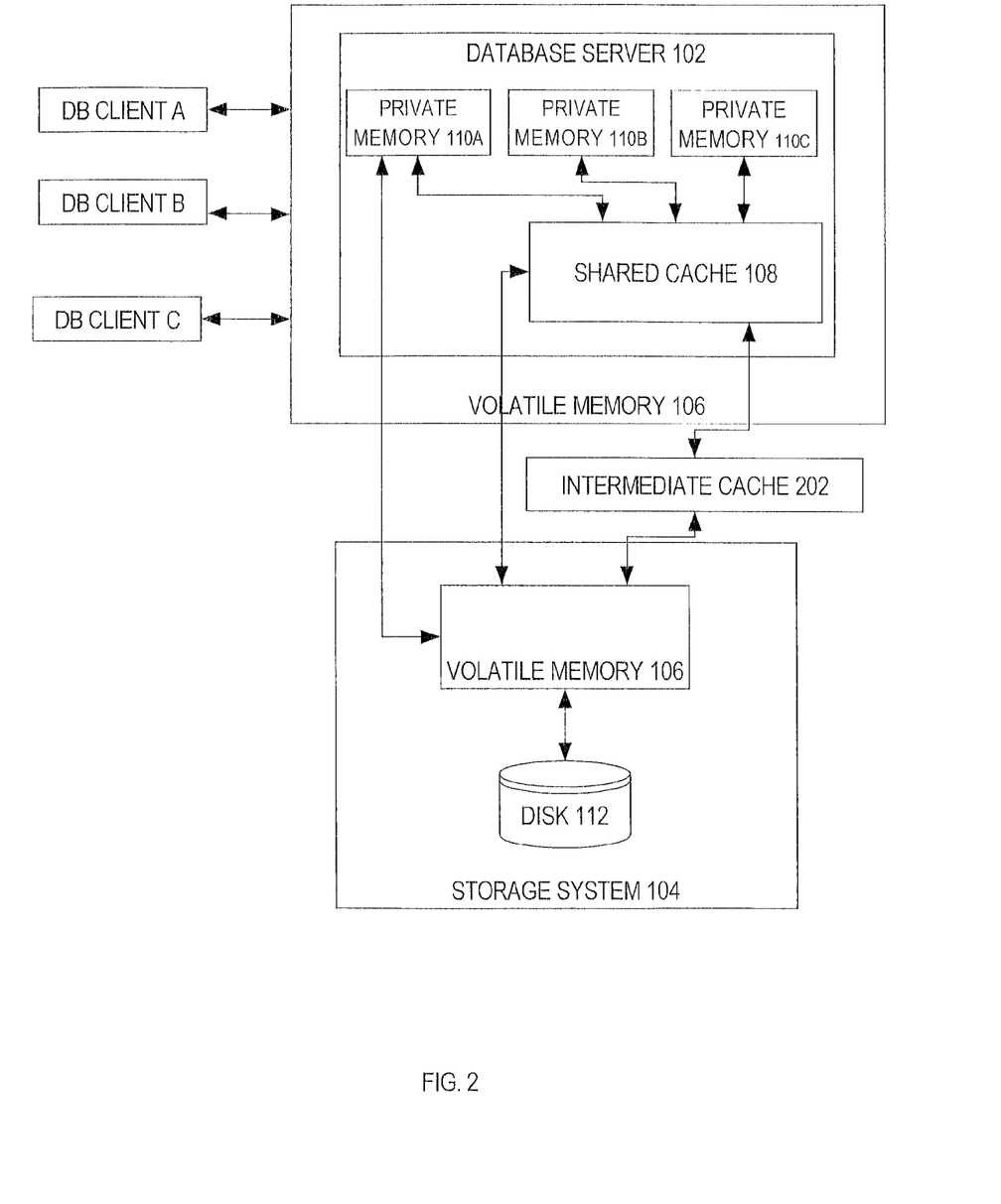
FIG. 2 is a block diagram of a database system that employs an intermediate cache between the shared cache used by the database server and the non-volatile storage used by the storage system, according to an embodiment of the invention.

As mentioned above, the techniques described herein involve making use of an intermediate cache that is logically positioned between the volatile memory of the database server and the non-volatile memory of the storage system. FIG. 2 is a block diagram of the computer system of FIG. 1 to which an intermediate cache 202 has been added. The nature of the intermediate cache 202 is such that database server 102 can retrieve items from the intermediate cache 202 faster than the database server 102 can retrieve item from disk 112. For example, intermediate cache 202 may be implemented using FLASH memory, or a relatively fast magnetic disk.

When retrieving data, intermediate cache 202 operates as a conventional cache. Thus, when an item is needed by database server 102, shared cache 108 is searched first. If the item is not in shared cache 108, then intermediate cache 202 is searched. If the item is not in intermediate cache 202, then the item is retrieved from non-volatile storage 112.

While intermediate cache 202 is used in a conventional manner when retrieving data, the techniques used to determine what items to store within intermediate cache 202 are not conventional. Specifically, copies of items are not automatically stored in intermediate cache 202 in response to those items being retrieved from the disk 112. Rather, in one embodiment, no items are stored in intermediate cache 202 at the time that they are retrieved from disk 112. Instead, items are stored in intermediate cache 202 only in response to those items being replaced in shared cache 108. Thus, intermediate cache 202 is used as an "overflow" area of shared cache 108.

Usage Example

As an example of how intermediate cache 202 operates as an overflow area for shared cache 108, assume that an item A is needed for an operation that was requested by DB client A. To retrieve a copy of item A, the database server first checks shared cache 108 for item A. If shared cache 108 does not have item A, then intermediate cache 202 will be checked for item A. If intermediate cache 202 does not have item A, then item A is retrieved from one of disk 112. The retrieved copy of item A is placed in shared cache 108. However, if shared cache 108 is full, then an item in shared cache 108 is replaced with item A.

For the purpose of explanation, assume that database server 102 determines that an item B that resides in shared cache 108 should be replaced with item A. Further assume that item B is "dirty". Because item B is dirty, item B is written to disk 112 before being replaced in shared cache 108 with item A. In addition to being written to disk 112, item B is also written to intermediate cache 202. Because items that are placed into intermediate cache 202 are placed into intermediate cache 202 in conjunction with being written to disk 112, the items in intermediate cache 202 will be the same versions as the copies that are on disk 112. Thus, the items that are stored in the intermediate cache 202 are "clean".

If the intermediate cache 202 is full, writing item B to intermediate cache 202 involves replacing an item C that currently resides in intermediate cache 202. However, replacing item C in the intermediate cache 202 does not require writing item C back to disk 112, because all of the items (including item C) that are stored in the intermediate cache 202 are clean.

After item B has been written to intermediate cache 202 and to disk 112, the database server 102 may be asked to perform an operation that involves item B. After determining that item B does not reside in shared cache 108, intermediate cache 202 is searched for item B. Under these circumstances, the copy of item B will reside in intermediate cache 202. Consequently, the database server 102 avoids the overhead associated with retrieving item B from disk 112 by retrieving item B directly from intermediate cache 202 into shared cache 108.

Caching Policies

In the example given above, when item B was replaced in shared cache, item B was written both to disk 112 and to intermediate cache 202. However, according to one embodiment, items are not always written to intermediate cache 202 when they are written to disk 112. Rather, items are written to intermediate cache 202 only when they satisfy certain caching policies. The caching policies that govern intermediate cache 202 may take many forms. For example, the decision about whether to store an item into the intermediate cache may hinge on (a) the database object to which the item belongs, (b) the nature of the database operation in which the item was involved, (c) the item type of the item, and/or (d) an attribute of the item. These are merely examples of the types of factors that may be used to determine whether or not an item is to be cached in the intermediate cache. While examples of how each of these factors may be used by the caching policies that govern the intermediate cache 202, these factors are merely exemplary. The caching policies that apply to intermediate cache 202 are not limited to any particular factors.

The Keep Directive

As mentioned above, the policies that govern intermediate cache 202 may include policies that take into account the database objects to which items belong. For example, according to one embodiment, database server 102 is configured to receive certain directives from users. In one embodiment, the directives include a KEEP directive by which users designate which objects within the database are "KEEP" objects. Items from KEEP objects are referred to herein as KEEP items.

Various mechanisms may be used to designate objects as KEEP objects. For example, in one embodiment, the database command that is submitted to create a database object may include a parameter value that indicates whether the object is a KEEP object. As another example, after an object has been created, a user may submit an ALTER command that changes a property of the object from non-KEEP to KEEP. The user may be motivated to do so, for example, by statistics that indicate that the object is accessed more frequently than other objects. There is no restriction on the type of objects that may be designated as KEEP objects. For example, KEEP objects may be tables, indexes, partitions of tables, tablespaces, etc.

As shall be explained hereafter, KEEP items receive preferential treatment once the KEEP items are stored in intermediate cache 202. Specifically, in one embodiment, once stored in intermediate cache 202, KEEP items are not replaced within intermediate cache 202 as long as there are non-KEEP items that can be replaced. For example, assume that a table X has been designated as a KEEP object, and that other tables Y and Z are non-KEEP objects. Further assume that intermediate cache 202 is full of items from tables X, Y and Z. Under these circumstances, if any new item needs to be placed in intermediate cache 202, then the new item would replace either a non-KEEP item from table Y, or a non-KEEP item from table Z. Items within intermediate cache 202 that belong to table X would not be considered as candidates for replacement, regardless of how long it has been since the items have been accessed.

To select which non-KEEP item to replace with the new item, any one of a variety of replacement policies may be used For example, the non-KEEP item that is replaced by the new item may be selected using a least recently used replacement policy, or a least frequently used policy.

In an alternative embodiment, a new item is allowed to replace a KEEP item within intermediate cache 202 under certain circumstances. In one embodiment that allows KEEP items to fill the entire intermediate cache 202, a new item is allowed to replace a KEEP item when the new item is a KEEP item and the entire intermediate cache is full of KEEP items. In an embodiment that shall be described hereafter, KEEP items are not allowed to fill the entire intermediate cache 202. In an embodiment that does not allow KEEP items to fill the entire intermediate cache 202, a new item is also allowed to replace a KEEP item when the new item is a KEEP item and the amount of intermediate cache 202 that is currently used by KEEP items has reached a predetermined maximum size.

Reserved and Unreserved Areas

According to one embodiment, the intermediate cache 202 is divided into two areas: a reserved area and an unreserved area. The reserved area is dedicated to storing KEEP items. The unreserved area stores non-KEEP items.

In one embodiment, the reserved area and the unreserved area have fixed sizes. For example, intermediate cache 202 may be a 100 gigabyte FLASH disk, where 70 gigabytes are used as the reserved area, and 30 gigabytes are used as the unreserved area. In this scenario, KEEP items are likely to remain in the intermediate cache 202 longer than non-keep items merely by virtue of the fact that there may be fewer KEEP items than non-KEEP items, and more storage within the FLASH disk is used to cache the KEEP items.

In an alternative embodiment, the sizes of the reserved and unreserved areas change dynamically based on the items that are stored in the intermediate cache 202. For example, in one embodiment, the unreserved area is initially established to include 100% of the intermediate cache 202. The unreserved area continues to include 100% of the intermediate cache until a KEEP item is stored in the intermediate cache 202. As KEEP items are stored in the intermediate cache 202, the size of the reserved area of the intermediate cache 202 automatically increases to accommodate the KEEP items. As the size of the reserved area increases, the size of the unreserved area decreases. For example, storing a 2 kilobyte KEEP item within in intermediate cache 202 increases the size of the reserved area by 2 kilobytes, and reduces the size of the unreserved area by 2 kilobytes.

If the size of the reserved area is allowed to increase unchecked, the reserved area may ultimately consume the entire intermediate cache 202. Once the reserved area has taken over the entire intermediate cache 202, the intermediate cache 202 will cease to cache any non-KEEP items. To avoid this situation, in one embodiment, a maximum size is established for the reserved area. In such an embodiment, the reserved area is allowed to expand until the reserved area has reached its maximum size. At that point, if additional KEEP items need to be stored in the intermediate cache 202, the new KEEP items are stored in the reserved area over other KEEP items, thereby avoiding the need to further extend the reserved area. When a new KEEP item needs to be stored over an existing KEEP item, the KEEP item that is replaced may be selected using any one of a variety of replacement policies. For example, in one embodiment, the KEEP item that is written over is selected using a least recently used replacement policy.

The None Directive

In one embodiment, a NONE directive may be used to indicate that items from a particular object should not be placed in intermediate cache 202. For example, if it is known that items from a particular table are rarely accessed with high frequency, the user may use the NONE directive to indicate that the table is a NONE object. Data items from NONE objects ("NONE items") are not placed into intermediate cache when they would otherwise have been placed in intermediate cache 202 if they had not been NONE items.

Caching Policies Based on Operation Type

As mentioned above, the caching policies that govern intermediate cache 202 may include policies that take into account the type of database operation that is being performed on the items. According to one embodiment, when the nature of the database operation that causes the database server 102 to retrieve items into volatile memory 106 is such that it is unlikely that those items will be accessed again in the near future, intermediate cache 202 is not used to cache copies of the items.

For example, when database server 102 performs a table scan, there is a relatively low probability that the items that are retrieved during the table scan will be needed again soon after completion of the table scan. Thus, according to one embodiment, items that are retrieved by database server 102 during performance of a table scan are not cached in intermediate cache 202.

Various mechanisms may be used to ensure that intermediate cache 202 is not used to cache items that are involved in certain types of operations. For example, in one embodiment, caching items in intermediate cache 202 is avoided by causing database server 102 to retrieve those items directly into the private memory of the DB client's for whom the operations are being performed. Because the items are loaded directly into private memory without first being placed in shared cache 108, the items will never be replaced in shared cache 108. Since the replacement of a dirty item in shared cache 108 is the trigger for storing the item in intermediate cache 202, items never stored in shared cache 108 will also never be stored in intermediate cache 202.

Caching Policies Based on Item Type

As mentioned above, the caching policies that govern intermediate cache 202 may include policies that take into account the item type of items that are being written to disk. For example, a typical database server 102 writes many different types of blocks to disk. Common block types include: an index block type, a data block type, an undo block type, a segment header block type, a transaction header block type, etc. The block type of a block indicates what type of information is contained within the block. For example, undo blocks contain information that allows database server 102 to undo changes that are made to other items.

According to one embodiment, when the type of an item is such that it is relatively unlikely that the item will be accessed again in the near future, the item is not stored in intermediate cache 202 in response to the item being written to disk 112. For example, although database server 102 may need to undo changes to items in a variety of circumstances (such as when the transactions that performed the changes abort, or when a non-current version of the items is needed), those circumstances are relatively infrequent. Therefore, according to one embodiment, undo blocks are not stored in intermediate cache 202 in response to being written to disk 112.

Caching Policies Based on Attributes of Items

As mentioned above, the caching policies that govern intermediate cache 202 may include policies that take into account the attributes of items that are being written to disk. For example, in one embodiment, database server 102 supports both encrypted items and non-encrypted items. According to one embodiment, to reduce the likelihood that encrypted items will be compromised, encrypted items are not stored to intermediate cache 202 when they are replaced in shared cache 108.

As another example, some storage systems support mirroring, where all changes that are made to a "primary" copy of an item are also made to a "secondary" copy of the same data item. In such systems, one attribute of an item is whether the item is a primary copy or a secondary copy. According to one embodiment, when an item is a primary copy, the item is stored to intermediate cache 202 in response to the primary copy being written to disk 112. On the other hand, when an item is a secondary copy, the item is not stored to intermediate cache 202 when written to disk 112.

Load-on-Read and Load-on-Replace

In the embodiments described above, copies of items are stored in intermediate cache 202 in response the items being replaced within shared cache 108. Thus, those embodiments represent a load-on-replace policy for storing items in intermediate cache 202. In alternative embodiment, load-on-read policies govern storage of items in intermediate cache 202.

According to load-on-read policies, items are stored in intermediate cache 202 at the time they are retrieved into volatile memory 106. Regardless of whether load-on-read or load-on-replace is used, the various caching policies described above may be applied to ensure that less-useful items are not stored in intermediate cache 202, and that the most useful items are stored longer in intermediate cache 202 than other items. Specifically, similar to load-on-replace, an embodiment that uses load-on-read may also employ caching policies that take into account one or more of: the type of database operation in which the items are involved, the database objects to which the items belong, the item type of the items and attributes of the items.

DB Server-Side Intermediate Cache

Figure 3:
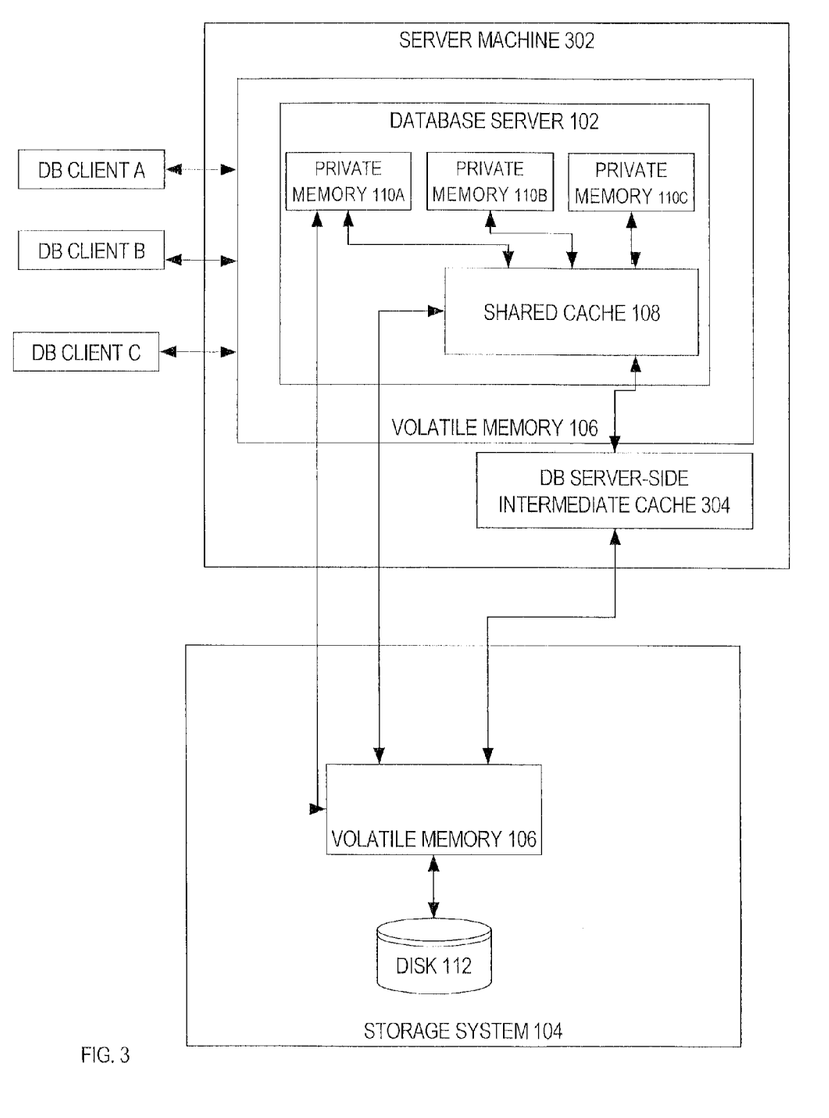
FIG. 3 is a block diagram of a database system in which the intermediate cache is local to the same server machine that is executing the database server, according to an embodiment of the invention.
Figure 4:
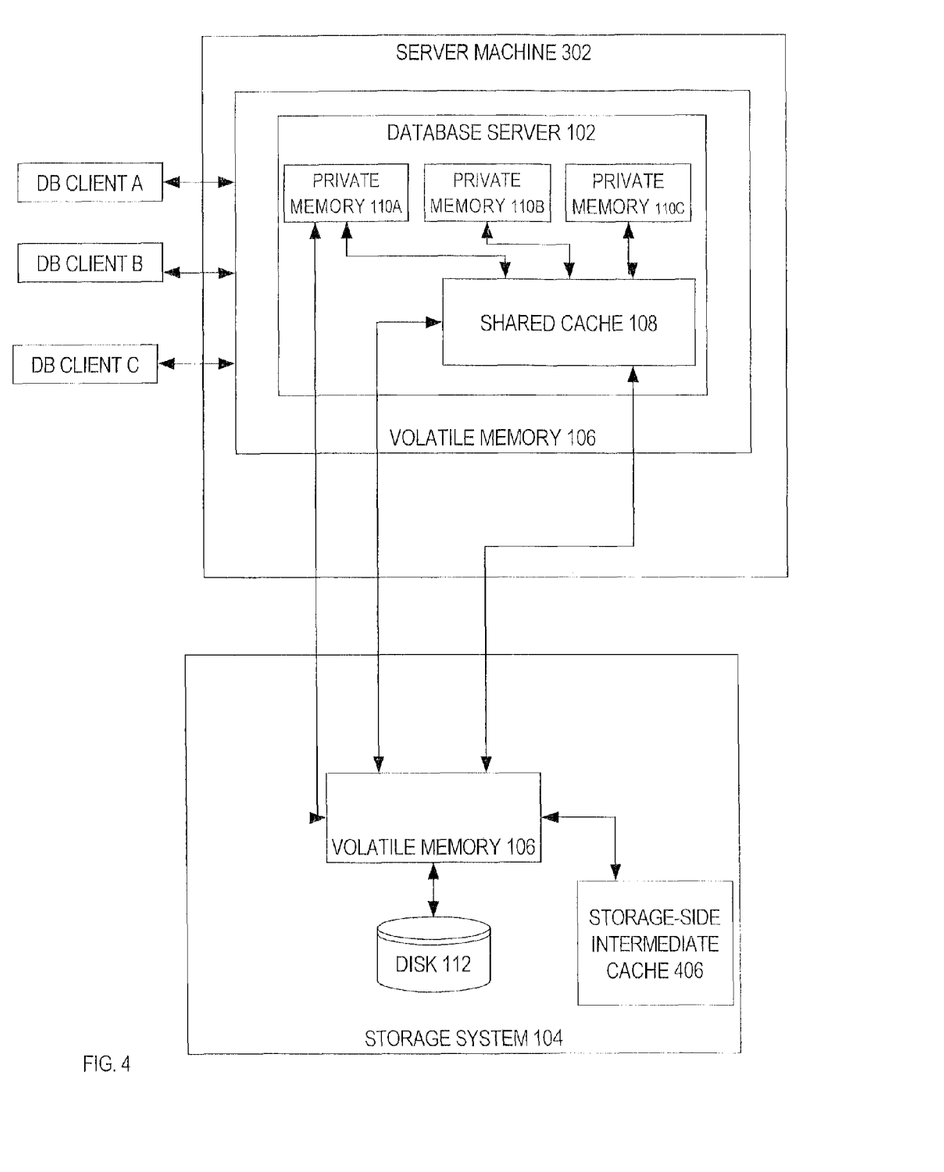
FIG. 4 is a block diagram of a database system in which the intermediate cache resides in the storage system, according to an embodiment of the invention.
Figure 5:
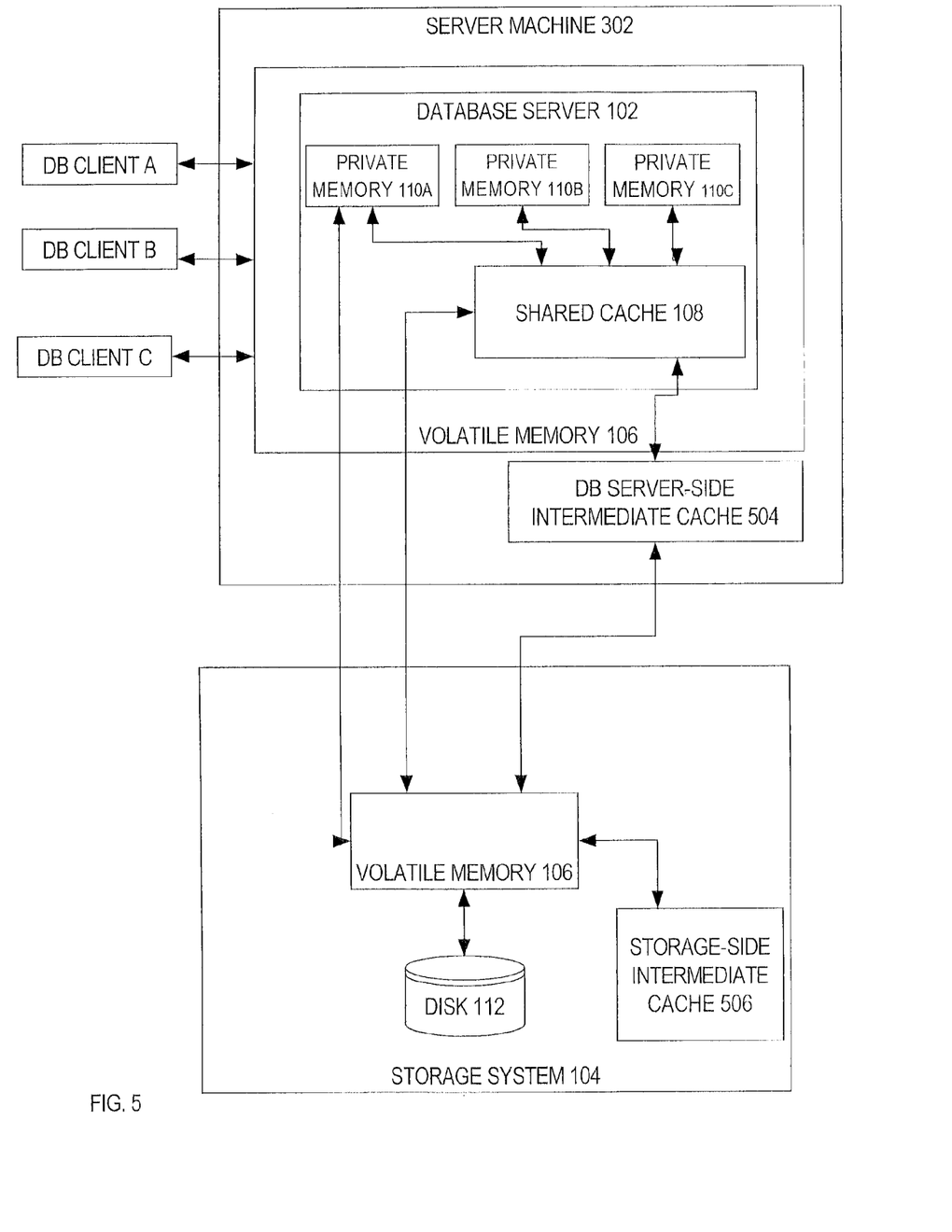
FIG. 5 is a block diagram of a database system that employs both a DB server-side intermediate cache, and a storage-side intermediate cache, according to an embodiment of the invention.

In FIG. 2, intermediate cache 202 is located between volatile memory 106 and disk 112. FIGS. 3, 4 and 5 illustrate in greater detail where intermediate cache 202 may be located, according to various embodiments of the invention.

Referring to FIG. 3, it illustrates an embodiment in which intermediate cache 202 is implemented as a DB server-side cache 304. DB server-side cache 304 is local to the server machine 302 on which database server 102 is executing. Consequently, retrieving items from DB server-side cache 304 do not incur the transmission overhead that would otherwise exist if the intermediate cache 202 were remote to server machine 302.

In some systems, the mirroring of data is handled by the storage system 104 in a manner that is transparent to the database server 102. In such systems, the primary/secondary distinction does not exist outside of the storage system 104. Therefore, when intermediate cache 202 is implemented as a DB server-side intermediate cache 304, the caching policy does not make use of any primary/secondary distinctions.

Storage-Side Intermediate Cache

FIG. 4 is a block diagram of an embodiment in which the intermediate cache 202 is implemented as a storage-side intermediate cache 406 that is local to the storage system 104. Because the storage-side intermediate cache 406 is not local to the server machine 302, retrieving items from storage-side intermediate cache 406 incurs more transmission overhead than would exist if the intermediate cache 202 were local to server machine 302. However, retrieval of items from storage-side intermediate cache 406 is still faster than retrieval of items from disk 112, since storage-side intermediate cache 406 is generally implemented on a faster storage device than disk 112. For example, storage-side intermediate cache 406 may be implemented on a FLASH drive, or on a relatively fast magnetic disk, while disk 112 is implemented by a relatively slow magnetic disk.

According to one embodiment, when intermediate cache 202 is implemented on the storage side, the database server 102 communicates information to storage system 104 to enable storage system 104 to implement intelligent caching policies. For example, when storage system 104 receives an I/O request for an item from disk 112, storage system 104 does not normally know the type of database operation in which the items are involved, the database objects to which the items belong, the item type of the items, nor the attributes of the items. Consequently, for storage system 104 to use caching policies that take into account these factors, database server 102 must provide additional information to storage system 104.

According to one embodiment, the additional information provided by database server 102 to storage system with a particular I/O request may simply be a flag that indicates whether or not storage system 104 should store the item involved in the I/O request in storage-side intermediate cache 406. For example, if the database server 102 is requesting items involved in a table scan, the database server 102 may set the flags that accompany the I/O requests to indicate that the items should not be stored in intermediate cache 406. Similarly, database server 102 may set the flags to indicate that items should not be stored in storage-side intermediate cache 406 if: the database server 102 is requesting items that belong to a NONE object, the database server 102 is writing undo blocks, or the database server 102 knows that the I/O involves encrypted information.

In embodiments that support KEEP and non-KEEP items, the database server 102 may include a second flag with each I/O request to indicate whether the item involved in the I/O request is a KEEP item or a non-KEEP item. Based on this information, the storage system 104 may maintain reserved and unreserved areas within storage-side intermediate cache 406, as described above.

In an alternative embodiment, rather than merely passing flags, database server 102 passes information that enables storage system 104 to make the decisions relating to the caching policies. For example, database server 102 may pass storage system 104 information that indicates which database objects have been designated as KEEP objects or NONE objects. Then, with each I/O request, database server 102 may pass to storage system 104 information that indicates the database object involved in the I/O request. Based on this information, storage system 104 can make the decision about whether to store the item specified in the I/O request in storage-side intermediate cache 406.

Similarly, database server 102 may pass to storage system 104 information that indicates the item type of the data item involved in the I/O request and/or an attribute of the data item involved in the I/O request. Based on this information, the storage system 104 may make decisions about whether to store in storage-side intermediate cache 406 the items involved in the I/O requests that it receives.

Load-on-Read-or-Write

In one embodiment, the storage-side intermediate cache 406 employs both load-on-read and load-on-write techniques. Thus, based on the caching policy, storage system 104 may copy items into storage-side intermediate cache 406 both when the items are transferred from disk 112 to server machine 302, and when the items are transferred from server machine 302 to disk 112.

In systems where the storage system 104 performs mirroring, the storage system 104 may implement a caching policy that takes into account the primary/secondary distinction without any additional information from the database server 102. Specifically, because storage system 104 is responsible for maintaining the primary and secondary copies, storage system 104 is aware of which copies are primary and which are secondary. Based on this information, the storage system 104 may implement a policy in which secondary copies of items are always treated as NONE items.

In one embodiment, the policy of treating secondary copies as NONE items has an exception that specifies that a secondary copy of an item is cached if involved in a read operation, but not when involved in a write operation. The secondary copy is cached during read operations because the secondary copy is typically read only when the primary copy is unavailable. Thus, when the subject of a read operation, the secondary copy effectively becomes the primary copy, and for the purpose of caching is treated as if the secondary copy were the primary copy.

Multiple-Server Systems

When implemented as a storage-side intermediate cache 406, intermediate cache 202 may benefit many database servers. For example, server machine 302 may be merely one of a plurality of server machines that are running database servers that are accessing data stored on storage devices that are managed by storage system 104. The same storage-side intermediate cache 406 may be used by storage system 104 to improve the performance of the I/O requests for all of those database servers.

Further, when multiple database servers are sharing access to the same database, it is possible that an item loaded into storage-side intermediate cache 406 in response to the request by one database server may be provided from the storage-side intermediate cache 406 to another database server that needs a copy of the same item.

Per-Object Cache-Hit Statistics

One benefit of having database server 102 provide storage system 104 information that identifies the database objects involved in the I/O requests is that this information enables storage system 104 to maintain statistics about I/O requests on a per-database-object basis. Such statistics may indicate that a particular database object is accessed frequently, while another database object is accessed rarely. This information may be helpful to a user who is deciding which database objects should be made KEEP objects and which database objects should be made NONE objects.

In one embodiment, these statistics are used to automatically transition objects between KEEP, non-KEEP, and NONE. For example, in response to determining, based on the per-object statistics, that a particular object is rarely accessed, the object may be automatically transitioned from a KEEP object to a non-KEEP object, or from a non-KEEP object to a NONE object. On the other hand, in response to determining that a particular object is frequently accessed, the object may be automatically transitioned from a NONE object to a non-KEEP object, or from a non-KEEP object to a KEEP object.

Dropped Objects

According to one embodiment, when a database object is dropped, all items that belong to the database object within intermediate cache 202 are invalidated, thereby making space for new objects. When KEEP items are dropped, the size of the reserved area shrinks, so that the memory occupied by the invalidated items can be used for either KEEP or non-KEEP items.

Preferably, the database server 102 sends a message to storage system 104 to inform storage system 104 when a data object has been dropped. In response, the storage system 104 uses the metadata about the database objects to which the cached items belong to identify and invalidate within the storage-side intermediate cache 506 all data items that belong to the dropped table.

Cache Expiration

According to one embodiment, items within intermediate cache 202 expire under certain conditions. When an item expires within cache 202, the storage within intermediate cache 202 in which the item resides is freed to allow storage of other items. If the item was a KEEP item, then the reserved area of intermediate cache 202 shrinks, thereby making the space available for either KEEP items or non-KEEP items.

According to one embodiment, cache expiration can occur at both the item level and the object level. For example, the expiration policy that governs intermediate cache 202 may be that (1) if an item has not been accessed in a week, the item expires, and (2) if not item that belongs to a particular object has been accessed in three days, then all items that belong to that object expire. In one embodiment, expiration timers are only set for KEEP items and KEEP objects, because unused non-KEEP items will be replaced simply by using least-recently-used replacement techniques on items in the unreserved area of intermediate cache 202.

Employing a cache expiration policy is particularly useful in embodiments that have a storage-side intermediate cache

406. When a storage-side intermediate cache 406 is involved, it is possible for information to be lost between server machine 302 and storage system 104. For example, assume that a particular KEEP object is dropped by database server 102. If for any reason storage system 104 is not told that the object has been dropped, then the storage-side intermediate cache 406 may continue to store items from the KEEP object indefinitely. An expiration policy ensures that the items that will never be used again will not continue to occupy the storage-side intermediate cache 406.

According to an alternative embodiment, the memory that stores KEEP items and KEEP objects that expire is not invalidated when in response to the expiration. Rather, the memory is logically moved from the reserved area to the unreserved area. As a result of this change, the reserved area shrinks, the unreserved area grows, and the expired KEEP items within the memory may be overwritten by non-KEEP items. If the expired KEEP items are accessed again before being replaced, then the memory is upgraded once again to be part of the reserved area, thereby removing those KEEP items from the unreserved area.

Combining Server-Side and Storage-Side Caches

FIG. 5 is a block diagram that employs both a DB server-side intermediate cache 504 and a storage-side intermediate cache 506. In one embodiment, DB server-side intermediate cache 504 is local to and used exclusively by server machine 302, while storage-side intermediate cache 506 is managed by storage system 104 and is used to speed up requests made by many database servers, some of which may not have their own DB server-side intermediate caches.

In a system that includes both a DB server-side intermediate cache 504 and a storage-side intermediate cache 506, when database server 102 requires an item, shared cache 108 is first search for the item, and if the item is not in shared cache 108, then DB server-side intermediate cache 504 is searched for the item. If the item does not exist in either shared cache 108 or DB server-side intermediate cache 504, then the database server requests the item from storage system 104. Storage system 104 first looks for the item in storage-side intermediate cache 506, and if the item is not in storage-side intermediate cache 506, then storage system 104 retrieves the item from disk 112.

In a system that includes both a DB server-side intermediate cache 504 and a storage-side intermediate cache 506, the caching policies need not be the same. For example, DB server-side intermediate cache 504 may allow caching of items retrieved during table scans but not allow caching of undo blocks, whereas storage-side intermediate cache 506 may allow caching of undo blocks, but my not allow caching of items retrieved during table scans.

Further, even in systems where both DB server-side intermediate cache 504 and a storage-side intermediate cache 506 allow the use of KEEP and NONE directives, the objects that are marked KEEP and NONE for DB server-side intermediate cache 504 may be different than the objects that are marked KEEP and NONE for the storage-side intermediate cache 506. For example, the same table T may be marked KEEP for the purpose of DB server-side caching, and marked non-KEEP for the purpose of storage-side caching. Under these circumstances, items from the object will be stored in the reserved area of DB server side cache 504, and stored in the unreserved area of storage-side intermediate cache 506.

Cache-Copy Metadata

According to one embodiment, metadata is maintained for items that reside in intermediate cache 202. However, in one embodiment, the amount of metadata maintained for items that reside in intermediate cache 202 is significantly smaller than the metadata maintained by database server 102 for items in shared cache 108. For example, in an embodiment that uses a load-on-replace policy, the copies of items in shared cache 108 will never be out of sync with the copies of those same items that are on disk 112. Therefore, the metadata for items in intermediate cache 202 need not include information about whether the items are dirty, and if dirty, when the times were modified.

As another example, in one embodiment the items in intermediate cache 202 are not owned exclusively by any transaction. Consequently, items within intermediate cache 202 need only support minimal lock state to indicate whether the items are subject to a shared lock or to no lock. In response to an item that resides in intermediate cache 202 being loaded into volatile memory 106, the minimal lock structure required for the item in intermediate cache 202 is converted into a larger lock structure required to support numerous types of locks, dirty data items, etc.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
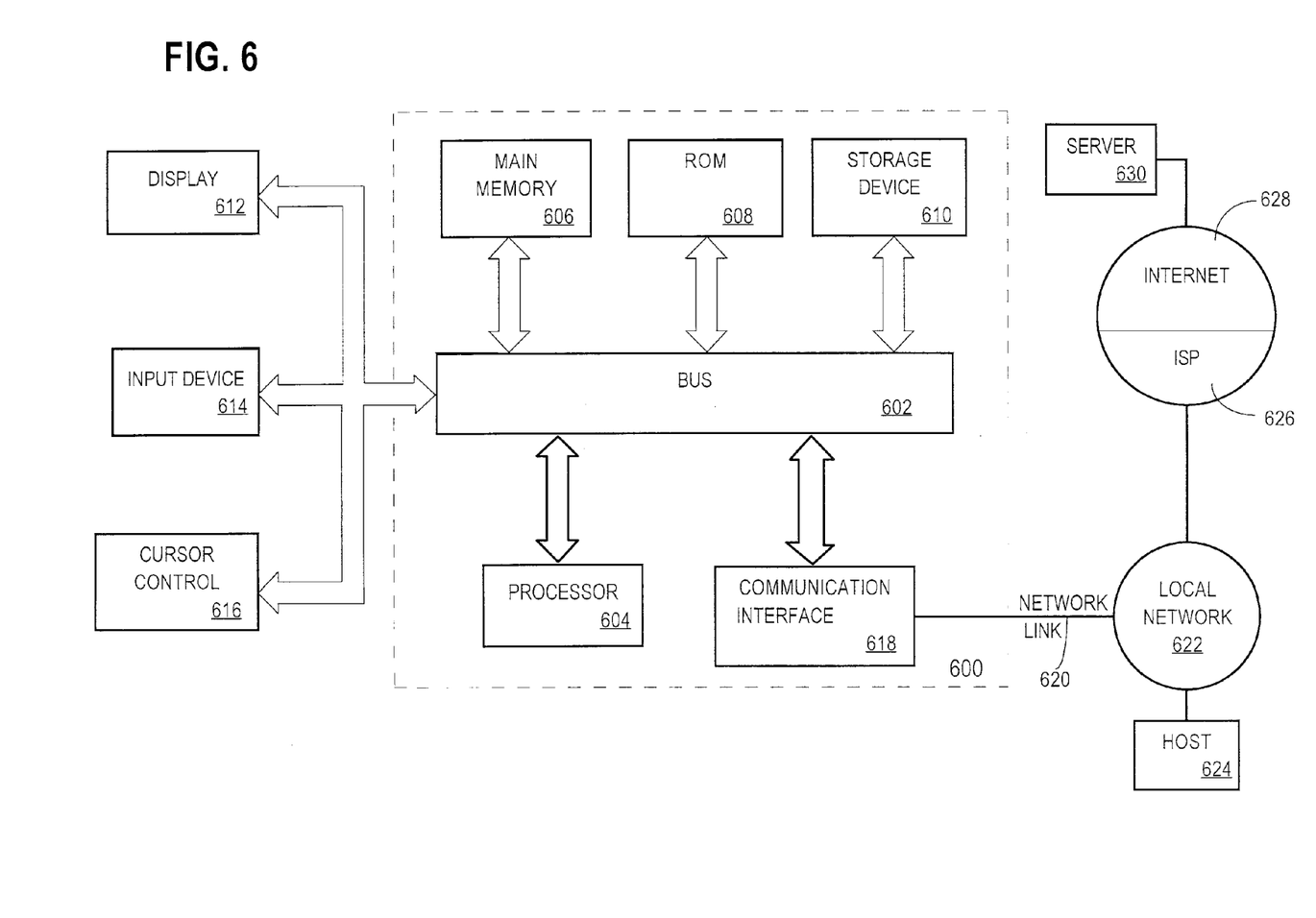
FIG. 6 is a block diagram upon which the techniques described herein may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim 1n any way. The specification and drawings are, accordingly, to be regarded in an illustrative rather than a restrictive sense.

What is claimed is:

1. A method comprising:
   receiving, from an application that performs operations on a plurality of objects, one or more indications of which objects, of the plurality of objects, have a particular designation;
   wherein the plurality of objects is persistently stored outside of an intermediate cache in data from disk blocks on one or more non-volatile storage devices;
   caching, in the intermediate cache, disk blocks that are transferred between (a) a volatile memory used by the application and (b) the one or more non-volatile storage devices;
   for a particular disk block that is transferred between the volatile memory and the one or more non-volatile storage devices, determining for which particular object, of the plurality of objects, the particular disk block stores data;

wherein data representative of the particular object is persistently stored on a particular plurality of disk blocks on the one or more non-volatile storage devices;

wherein caching the data includes using the intermediate cache, with respect to the particular disk block, in a manner that is based, at least in part, on whether the particular object for which the particular disk block stores data has said particular designation;

wherein the method is performed by one or more computing devices.

2. The method of claim 1 wherein:

the particular designation is a KEEP designation; and the step of using the intermediate cache includes:
    storing the particular disk block in a reserved area of the intermediate cache if the particular disk block belongs to an object with the KEEP designation; and
    storing the particular disk block in an unreserved area of the intermediate cache if the particular disk block belongs to an object that does not have the KEEP designation.

3. The method of claim 2 wherein:

the particular disk block belongs to an object that has the KEEP designation; and storing the particular disk block in a reserved area includes:
    within the intermediate cache, replacing another disk block with the particular disk block, wherein the other disk block stores data that belongs to an object that does not have a KEEP designation; and
    in response to replacing the other disk block with the particular disk block, increasing the size of the reserved area and decreasing the size of the unreserved area.

4. The method of claim 1 wherein:

the particular designation is a NONE designation; and the step of using the intermediate cache includes caching the particular disk block in the intermediate cache only if the particular disk block belongs to an object that does not have a NONE designation.

5. The method of claim 1, wherein the plurality of objects include one or more of: database objects, files, or collections, and wherein the disk blocks correspond to one or more of table rows, data blocks, index entries, or file portions.

6. A method comprising:

caching, in an intermediate cache, data that is transferred between a volatile memory used by a database server and a non-volatile storage device that is used to persistently store the data;

wherein the step of caching the data includes using the intermediate cache, with respect to an item of the data that is transferred between the volatile memory and the non-volatile storage, in a manner that is based, at least in part, on one or more of:
    whether the item is a disk block of an index block type;
    whether the item is a disk block of a data block type;
    whether the item is a disk block of an undo block type;
    whether the item is encrypted;
    whether the item is a secondary copy of a mirrored item; or
    whether the item is involved in a table scan operation;

wherein the method is performed by one or more computing devices.

7. The method of claim 6 wherein using the intermediate cache includes determining whether or not to store the item in the intermediate cache based, at least in part, on whether the item is a disk block of an index block type.

8. The method of claim 6 further comprising determining not to store the item in the intermediate cache based on the item being a disk block of an undo block type.

9. The method of claim 6 wherein using the intermediate cache includes determining whether or not to store the data item in the intermediate cache based, at least in part, on whether the item is a disk block of a data block type.

10. The method of claim 6 further comprising determining not to store the item in the intermediate cache based on the item being a secondary copy of a mirrored item.

11. The method of claim 6 further comprising determining not to store the item in the intermediate cache based on the item being encrypted.

12. The method of claim 6 further comprising determining not to store the item in the intermediate cache based on the item being involved in a table scan operation.

13. The method of claim 6 wherein the intermediate cache is implemented by FLASH memory.

14. The method of claim 6 wherein the intermediate cache is local to a server machine on which the database server is executing.

15. The method of claim 14 wherein items are loaded into intermediate cache based on a load-on-replace policy.

16. The method of claim 6 wherein the intermediate cache is managed by a storage system to which the non-volatile storage device belongs.

17. The method of claim 16 wherein the database server is one of a plurality of database servers for which the storage system stores items in the intermediate cache.

18. The method of claim 16 wherein items are loaded into the intermediate cache on a load-on-read and load-on-write policy.

19. The method of claim 16 wherein:

the step of using the intermediate cache is performed by the storage system; and the method further comprises the storage system receiving, from the database server,
    information that indicates at least one of:
    whether the item is a disk block of an index block type;
    whether the item is a disk block of a data block type;
    whether the item is a disk block of an undo block type;
    whether the item is encrypted;
    whether the item is a secondary copy of a mirrored item; or
    a type of database operation in which the item is involved.

20. A method comprising:

caching, in an intermediate cache, data that is transferred between a volatile memory used by a database server and a non-volatile storage device that is used to persistently store the data, the database server configured to execute a plurality of distinct types of database operations with respect to the data;

wherein the step of caching the data includes using the intermediate cache, with respect to an item of the data that is transferred between the volatile memory and the non-volatile storage, in a manner that is base, at least in part on:
    for which type of database operation, of the plurality of distinct types of database operations, the database server is using the item;

wherein using the intermediate cache includes determining whether or not to store the data item in the intermediate cache based, at least in part, on the type of database operation in which the item is involved.

21. A non-transitory computer-readable media storing instructions which, when executed by one or more processors, cause:
 receiving, from an application that performs operations on a plurality of objects, one or more indications of which objects, of the plurality of objects, have a particular designation;
 wherein the plurality of objects is persistently stored outside of an intermediate cache in data from disk blocks on one or more non-volatile storage devices;
 caching, in the intermediate cache, disk blocks that are transferred between (a) a volatile memory used by the application and (b) the one or more non-volatile storage devices;
 for a particular disk block that is transferred between the volatile memory and the one or more non-volatile storage devices, determining for which particular object, of the plurality of objects, the particular disk block stores data;
 wherein data for the particular object is persistently stored on a particular plurality of disk blocks on the one or more non-volatile storage devices;
 wherein caching the data includes using the intermediate cache, with respect to the particular disk block, in a manner that is based, at least in part, on whether the particular object for which the particular disk block stores data has said particular designation.

22. The non-transitory computer-readable media of claim 21 wherein:
 the particular designation is a KEEP designation; and
 the step of using the intermediate cache includes:
  storing the particular disk block in a reserved area of the intermediate cache if the particular disk block belongs to an object with the KEEP designation; and
  storing the particular disk block in an unreserved area of the intermediate cache if the particular disk block belongs to an object that does not have the KEEP designation.

23. The non-transitory computer-readable media of claim 22 wherein:
 the particular disk block belongs to an object that has the KEEP designation; and
 storing the particular disk block in a reserved area includes:
  within the intermediate cache, replacing another disk block with the particular disk block, wherein the other disk block stores data that belongs to an object that does not have a KEEP designation; and
  in response to replacing the other disk block with the particular disk block, increasing the size of the reserved area and decreasing the size of the unreserved area.

24. The non-transitory computer-readable media of claim 21 wherein:
 the particular designation is a NONE designation; and
 the step of using the intermediate cache includes caching the particular disk block in the intermediate cache only if the particular disk block belongs to an object that does not have a NONE designation.

25. The non-transitory computer-readable media of claim 21, wherein the plurality of objects include one or more of: database objects, files, or collections, and wherein the disk blocks correspond to one or more of table rows, data blocks, index entries, or file portions.

26. A non-transitory computer-readable media storing instructions which, when executed by one or more processors, cause:
 caching, in an intermediate cache, data that is transferred between a volatile memory used by a database server and a non-volatile storage device that is used to persistently store the data;
 wherein the step of caching the data includes using the intermediate cache, with respect to an item of the data that is transferred between the volatile memory and the non-volatile storage, in a manner that is based, at least in part, on one or more of:
  whether the item is a disk block of an index block type;
  whether the item is a disk block of a data block type;
  whether the item is a disk block of an undo block type;
  whether the item is encrypted;
  whether the item is a secondary copy of a mirrored item; or
  whether the item is involved in a table scan operation.

27. The non-transitory computer-readable media of claim 26 wherein using the intermediate cache includes determining whether or not to store the item in the intermediate cache based, at least in part, on whether the item is a disk block of an index block type.

28. The non-transitory computer-readable media of claim 26 further comprising determining not to store the item in the intermediate cache based on the item being disk block of an undo block type.

29. The non-transitory computer-readable media of claim 26 wherein using the intermediate cache includes determining whether or not to store the data item in the intermediate cache based, at least in part, on whether the item is a disk block of a data block type.

30. The non-transitory computer-readable media of claim 26 further comprising instructions for determining not to store the item in the intermediate cache based on the item being a secondary copy of a mirrored item.

31. The non-transitory computer-readable media of claim 26 further comprising instructions for determining not to store the item in the intermediate cache based on the item being encrypted.

32. The non-transitory computer-readable media of claim 26 further comprising instructions for determining not to store the item in the intermediate cache based on the item being involved in a table scan operation.

33. The non-transitory computer-readable media of claim 26 wherein the intermediate cache is implemented by FLASH memory.

34. The non-transitory computer-readable media of claim 26 wherein the intermediate cache is local to a server machine on which the database server is executing.

35. The non-transitory computer-readable media of claim 34 wherein items are loaded into intermediate cache based on a load-on-replace policy.

36. The non-transitory computer-readable media of claim 26 wherein the intermediate cache is managed by a storage system to which the non-volatile storage device belongs.

37. The non-transitory computer-readable media of claim 36 wherein the database server is one of a plurality of database servers for which the storage system stores items in the intermediate cache.

38. The non-transitory computer-readable media of claim 36 wherein items are loaded into the intermediate cache on a load-on-read and load-on-write policy.

39. The non-transitory computer-readable media of claim 36 wherein:
 using the intermediate cache is performed by the storage system; and the computer-readable media further comprises instructions for the storage system receiving, from the database server, information that indicates at least one of:
whether the item is a disk block of an index block type;
whether the item is a disk block of a data block type;
whether the item is a disk block of an undo block type;
whether the item is encrypted;
whether the item is a secondary copy of a mirrored item; or
a type of database operation in which the item is involved.

40. A non-transitory computer-readable media storing instructions which, when executed by one or more processors, cause:
caching, in an intermediate cache, data that is transferred between a volatile memory used by a database server and a non-volatile storage device that is used to persistently store the data, the database server configured to execute a plurality of distinct types of database operations with respect to the data;
wherein the step of caching the data includes using the intermediate cache, with respect to an item of the data that is transferred between the volatile memory and the non-volatile storage, in a manner that is based at least in part on:
for which type of database operation, of the plurality of distinct types of database operations, the database server is using the item;
wherein using the intermediate cache includes determining whether or not to store the data item in the intermediate cache based, at least in part, on the type of database operation in which the item is involved.

41. A method comprising:
caching, in an intermediate cache, disk blocks that are transferred between a volatile memory used by a database server and a non-volatile storage device that is used to persistently store the disk blocks, the database server configured to perform database operations with respect to a plurality of database objects, the disk blocks storing data that belong to the plurality of database objects;
wherein the step of caching the disk blocks includes using the intermediate cache, with respect to a particular disk block that is transferred between the volatile memory and the non-volatile storage, in a manner that is based, at least in part, on:
whether the particular disk block is one of a plurality of disk blocks that stores data belonging to a particular database object, of the plurality of database objects, that has a particular designation, the particular database object being one of: a table, index, or tablespace;
wherein the method is performed by one or more computing devices.

42. The method of claim 41 further comprising:
receiving data that indicates that the particular database object to which the data in the disk block belongs is designated as a NONE object; and
determining not store the particular disk block in the intermediate cache because the data in the particular disk block belongs to an object that is designated as a NONE object.

43. The method of claim 41 further comprising:
receiving data that designates the particular database object as a KEEP object;
storing the particular disk block in a reserved area of the intermediate cache because the particular database object is designated as a KEEP object;
storing a second data block in an unreserved area of the of the intermediate cache in response to determining that the second data block belongs to a different database object that has not been designated as a KEEP object.

44. The method of claim 43 further comprising preventing disk blocks that do not belong to KEEP objects from replacing, within the intermediate cache, disk blocks that belong to KEEP objects, while allowing disk blocks that belong to KEEP objects to replace, within the intermediate cache, disk blocks that do not belong to KEEP objects.

45. The method of claim 41, further comprising:
receiving, from the database server, one or more indications of which database objects of the plurality of database objects have the particular designation;
based on information received in an input/output request from the database server for the particular disk block, identifying to which database object, of the plurality of database objects, the data within the particular disk block belongs.

46. A non-transitory computer-readable media storing instructions which, when executed by one or more processors, cause:
caching, in an intermediate cache, disk blocks that are transferred between a volatile memory used by a database server and a non-volatile storage device that is used to persistently store the disk blocks, the database server configured to perform database operations with respect to a plurality of database objects, the disk blocks storing data that belong to the plurality of database objects;
wherein the step of caching the disk blocks includes using the intermediate cache, with respect to a particular disk block that is transferred between the volatile memory and the non-volatile storage, in a manner that is based, at least in part, on:
whether the particular disk block is one of a plurality of disk blocks that stores data belonging to a particular database object, of the plurality of database objects, that has a particular designation, the particular database object being one of: a table, index, or tablespace;
wherein the method is performed by one or more computing devices.

47. The non-transitory computer-readable media of claim 46 further comprising instructions for:
receiving data that indicates that the particular database object to which the data in the disk block belongs is designated as a NONE object; and
determining not store the particular disk block in the intermediate cache because the data in the particular disk block belongs to an object that is designated as a NONE object.

48. The non-transitory computer-readable media of claim 46 further comprising instructions for:
receiving data that designates the particular database object as a KEEP object;
storing the particular disk block in a reserved area of the intermediate cache because the particular database object is designated as a KEEP object;
storing a second data block in an unreserved area of the of the intermediate cache in response to determining that the second data block belongs to a different database object that has not been designated as a KEEP object.

49. The non-transitory computer-readable media of claim 48 further comprising instructions for preventing disk blocks that do not belong to KEEP objects from replacing, within the intermediate cache, disk blocks that belong to KEEP objects, while allowing disk blocks that belong to KEEP objects to replace, within the intermediate cache, disk blocks that do not belong to KEEP objects.

50. The non-transitory computer-readable media of claim 46, further comprising instructions for:
   receiving, from the database server, one or more indications of which database objects of the plurality of database objects have the particular designation;
   based on information received in an input/output request from the database server for the particular disk block, identifying to which database object, of the plurality of database objects, the data within the particular disk block belongs.

* * * * *